US008854837B2

(12) United States Patent
Kim et al.

(10) Patent No.: US 8,854,837 B2
(45) Date of Patent: Oct. 7, 2014

(54) BOOST CONVERTER FOR REDUCING VOLTAGE STRESS

(75) Inventors: Hyo Young Kim, Gyunggi-do (KR); Jong Rak Kim, Gyunggi-do (KR); Sung Hun Oh, Gyunggi-do (KR); Jin Hwan Kim, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 486 days.

(21) Appl. No.: 13/220,188

(22) Filed: Aug. 29, 2011

(65) Prior Publication Data

US 2012/0063172 A1 Mar. 15, 2012

(30) Foreign Application Priority Data

Sep. 14, 2010 (KR) ........................ 10-2010-0090082

(51) Int. Cl.
*H02M 3/335* (2006.01)
*H02M 1/34* (2007.01)

(52) U.S. Cl.
CPC ............ *H02M 3/335* (2013.01); *Y02B 70/1491* (2013.01); *H02M 2001/346* (2013.01)
USPC .......................................................... 363/16

(58) Field of Classification Search
CPC .................................. H02M 1/32; H02M 1/34
USPC ............... 323/222; 363/16, 21.04; 315/209 R
See application file for complete search history.

(56) References Cited

U.S. PATENT DOCUMENTS

| 5,144,204 A | * | 9/1992 | Nerone et al. ............. 315/209 R |
| 5,321,348 A | * | 6/1994 | Vinciarelli et al. ........... 323/222 |
| 5,440,472 A | | 8/1995 | Sturgeon |
| 7,161,331 B2 | * | 1/2007 | Wai et al. ..................... 323/222 |
| 2004/0227496 A1 | | 11/2004 | Hosotani et al. |

FOREIGN PATENT DOCUMENTS

| CN | 1551470 A | 12/2004 |
| CN | 101501603 A | 8/2009 |
| CN | 101783588 A | 7/2010 |

(Continued)

OTHER PUBLICATIONS

Wai, RJ, et al. "High-Efficiency Voltage-Clamped DC-DC Converter with Reduced Reverse-Recovery Current and Switch-Voltage Stress". IEEE Publication.vol. 53, No. 1, Feb. 2006.

(Continued)

*Primary Examiner* — Adolf Berhane
*Assistant Examiner* — Jye-June Lee
(74) *Attorney, Agent, or Firm* — McDermott Will & Emery LLP

(57) ABSTRACT

There is provided a boost converter capable of reducing voltage stress within each element thereof, without using a separate loss snubber circuit, by clamping a voltage applied to an output diode to correspond to a difference between an input voltage and an output voltage. The boost converter includes a transformer including a primary winding receiving an input power and a secondary winding electromagnetically coupled to the primary winding and having a preset turn ratio therewith; a switching unit switching the input power transferred to the primary winding on and off according to a preset duty ratio; a stabilizing unit including an output diode rectifying the power outputted from the secondary winding to stabilize an output power; and a clamping unit clamping a voltage applied to the output diode to correspond to a difference between the input power and the output power during a switching on operation of the switching unit.

4 Claims, 1 Drawing Sheet

(56) References Cited

FOREIGN PATENT DOCUMENTS

| | | |
|---|---|---|
| JP | 2001-071981 | 3/2001 |
| JP | 2001-218452 | 8/2001 |
| WO | 20071132345 A2 | 11/2007 |

OTHER PUBLICATIONS

Korean Office Action, and English translation thereof, issued in Korean Patent Application No. 10-2010-0090082 dated Dec. 5, 2011.
Chinese Office Action issued in Chinese Application No. 201110265658.1 dated Jul. 8, 2014, w/English translation.

\* cited by examiner

BOOST CONVERTER FOR REDUCING VOLTAGE STRESS

CROSS-REFERENCE TO RELATED APPLICATIONS

This application claims the priority of Korean Patent Application No. 10-2010-0090082 filed on Sep. 14, 2010, in the Korean Intellectual Property Office, the disclosure of which is incorporated herein by reference.

BACKGROUND OF THE INVENTION

1. Field of the Invention

The present invention relates to a boost converter, and more particularly, a boost converter capable of reducing voltage stress within each element thereof, and particularly, of reducing voltage stress within each element thereof, without using a separate loss snubber circuit, by clamping a voltage applied to an output diode to correspond to a difference between an input voltage and an output voltage.

2. Description of the Related Art

Recently, research into various power supply devices capable of boosting a low DC voltage has been conducted with regard to an electrical driving system using a fuel cell or a battery, semiconductor fabrication equipment, large display devices, ultrasonic devices, X-ray devices, and the like.

In the case of such power supply devices, a booster converter may be a representative power supply device.

A general boost converter has a difficulty in obtaining a high boost ratio. Therefore, according to the related art, a plurality of boost converters have been connected in series so as to obtain the high boost ratio; however, this method has caused problems such as a reduction in power conversion efficiency and an increase in unit costs due to an increase in the number of components used therein.

In order to solve the problems, a boost converter 10 employing a tap inductor as shown in FIG. 1 has been used; however, it is necessary to use a loss snubber circuit therewith in order to reduce a surge voltage generated during power conversion switching.

However, since this snubber still leads to a reduction of power conversion efficiency and a surge voltage may still occur, an element having a high voltage resistance should be used, thereby causing an increase in manufacturing costs.

SUMMARY OF THE INVENTION

An aspect of the present invention provides a boost converter capable of reducing voltage stress within each element thereof, and particularly, of reducing voltage stress within the elements thereof, without using a separate loss snubber circuit, by clamping a voltage applied to an output diode to correspond to a difference between an input voltage and an output voltage.

According to an aspect of the present invention, there is provided a boost converter including: a transformer including a primary winding receiving an input power and a secondary winding electromagnetically coupled to the primary winding and having a preset turn ratio therewith; a switching unit switching the input power transferred to the primary winding on and off according to a preset duty ratio; a stabilizing unit including an output diode rectifying the power outputted from the secondary winding to thereby stabilize an output power; and a clamping unit clamping a voltage applied to the output diode to correspond to a difference between the input power and the output power during a switching on operation of the switching unit.

The transformer may further include a leakage inductor connected in series between one end of the primary winding and one end of an input power terminal receiving the input power and a magnetization inductor parallel-connected to one end and the other end of the primary winding.

The switching unit may include a switch connected between a connection point, at which the other end of the primary winding and one end of the secondary winding are connected to each other, and a ground, and the clamping unit may include a first diode having an anode connected to one end of the input power terminal and a cathode connected to one end of the output diode, and a first capacitor having one end connected to the cathode of the first diode and the other end connected to the other end of the secondary winding.

One end of the output diode may be connected to the cathode of the first diode and one end of the first capacitor, and the stabilizing unit may further include an output capacitor connected to the other end of the output diode and the ground.

The primary and secondary windings may be wound in the same direction.

The first capacitor may be charged with a voltage from the secondary winding and an input voltage while the switch is switched on, and transfer the charged voltage to the stabilizing unit while the switch is switched off.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will now be described in detail with reference to the accompanying drawings.

Figure 2:
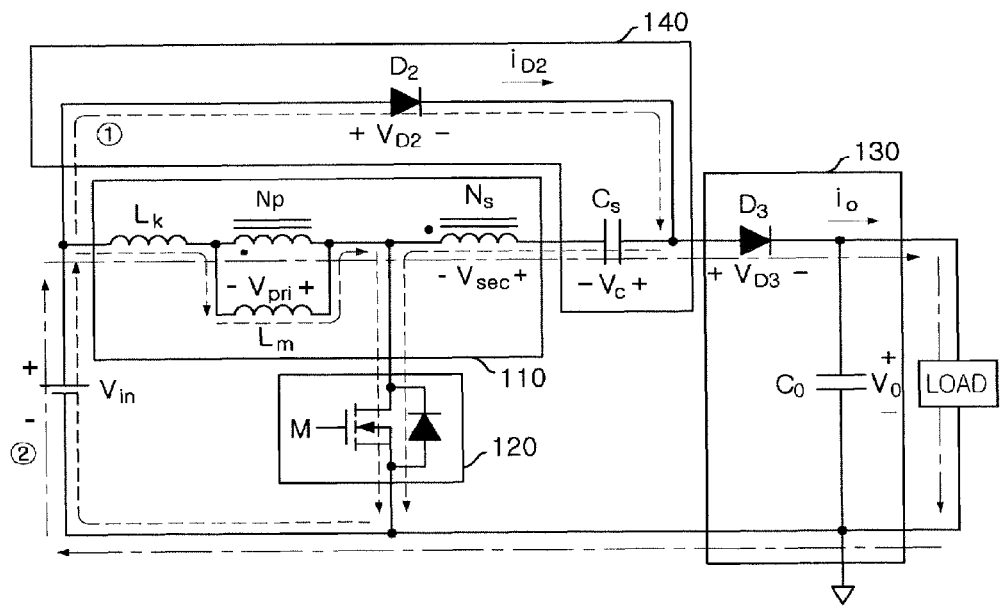
FIG. 2 is a schematic configuration view of a boost converter according to an exemplary embodiment of the present invention.

FIG. 2 is a schematic configuration view of a boost converter according to an exemplary embodiment of the present invention.

Referring to FIG. 2, a boost converter 100 according to an exemplary embodiment of the present invention may include a transformer 110, a switching unit 120, a stabilizing unit 130, and a clamping unit 140.

The transformer 110 may include a primary winding Np and a secondary winding Ns, and may further include a leakage inductor Lk and a magnetization inductor Lm.

Each of the primary and secondary windings Np and Ns may have a preset number of turns, and may be electromagnetically coupled to each other to form a preset turn ratio therebetween. The primary winding and the secondary winding may be wound in the same direction.

The switching unit 120 may include at least one switch M, and may be switched on and off to control power transfer from the primary winding Np to the secondary winding Ns.

The stabilizing unit 130 may include an output diode D3 and an output capacitor Co, and may stabilize an output power.

The clamping unit 140 may include a first diode D2 and a first capacitor Cs, and may clamp a voltage applied to the output diode D3 to correspond to a difference between an input voltage and an output voltage during the switching on operation of the switch M. Meanwhile, the first capacitor Cs may be charged with a voltage from the secondary winding Ns and the input voltage Vin during the switching on operation of the switch M, and may transfer the charged voltage to the output diode D3 during switching off operation of the switch M.

The connection relationship between the respective components shown in FIG. 2 will hereinafter be described in detail. The other end of the primary winding Np of the transformer 110 may be connected to one end of the switch M of the switching unit 120. The other end of the switch M may be connected to a ground; an anode of the first diode D2 may be connected to one end of an input power terminal and a cathode thereof may be connected to the other end of the first capacitor Cs; an anode of the output diode D3 may be connected to the other end of the first capacitor Cs and a cathode thereof may be connected to one end of the capacitor Co; and the other end of the capacitor Co may be connected to the ground. One end of the first capacitor Cs may be connected to the other end of the secondary winding Ns; and one end of the secondary winding Ns may be connected to one end of the switch M. One end of the primary winding Np may be connected to one end of the input power terminal to which an input power Vin is inputted through the leakage inductor Lk, and the magnetization inductor may be connected to the primary wiring Np in parallel.

Referring to FIG. 2, current flow during the switching on operation of the switch M may be represented by a dotted line denoted by reference number ①, and current flow during the switching off operation of the switch M may be represented by a dotted line, different to that of the reference number ①, denoted by reference number ②.

During the switching on operation of the switch M, the current may flow through two paths, one path from the input power Vin to the switch M through the primary winding Ns and the other path from the first diode D2 to the input power Vin through the first capacitor Cs, the secondary winding Ns and the switch M.

During the switching off operation of the switch M, the current may flow through a path from the input power Vin to the output diode D3 through the primary and secondary windings Np and Ns and the first capacitor Cs.

During the switching on operation of the switch M, the input power Vin is applied to the primary winding Np of the transformer 110, such that a voltage Vpri in the primary winding Np becomes the input power Vin. The secondary winding Ns transfers the input power nVin, according to a turn ratio n of the primary winding Np and the secondary winding Ns, to a link capacitor Cs, such that a voltage Vc in the link capacitor Cs is equal to a voltage Vsec in the secondary winding Ns, which is equal to the sum of the input power Vin and the input power nVin according to the turn ratio n.

Accordingly, during the switching on operation of the switch M, a voltage level of the input power Vin may be applied to the primary winding Np, and during the switching off operation of the switch M, the voltage Vpri applied to the primary winding Np may be given by Equation 1 as follows:

$$Vpri = \frac{(Vo - Vin - Vc)}{(1 + n)} \qquad \text{Equation 1}$$

Herein, n means a turn ratio; Vc means a voltage applied to the first capacitor Cs; and Vo means a voltage level of the output power.

When Equation 1 is written with respect to the voltage applied to the secondary winding Ns, the following Equation 2 is obtained:

$$DVin = (1 - D)\frac{(Vo - Vin - Vc)}{(1 + n)} \qquad \text{Equation 2}$$

Herein, D means a switching duty.

When Equation 2 is written with respect to the output power Vo, the following Equation 3 is obtained:

$$Vo = \frac{(nVin + 2Vin - DVin)}{(1 - D)} \qquad \text{Equation 3}$$

According to the Equations as described above, electrical characteristics of the tap inductor boost converter according to the related art and the boost converter according to the exemplary embodiment of the present invention will be described with reference to Table.

TABLE

| | Condition Output Voltage = 120 V, Turn Ratio = 2 | | | | |
|---|---|---|---|---|---|
| | Duty Ratio | Vds | VD2 | VD3 | Vc |
| Prior Art | 0.57 | 56 | — | 128 | — |
| Present Invention | 0.25 | 32 | 96 | 96 | 72 |

Figure 1:
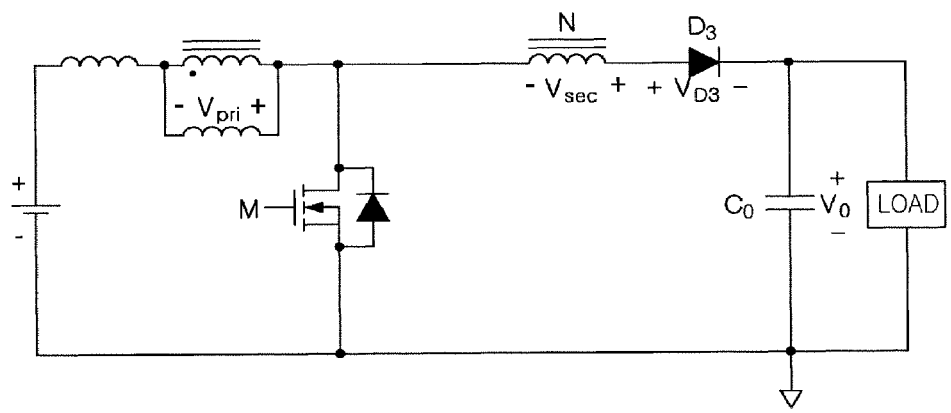
FIG. 1 is a schematic configuration view of a boost converter according to the related art.

Referring to the Table, when the output voltage is set to 120V and the turn ratio is set to 2, the tap inductor boost converter according to the related art shown in FIG. 1 may have the voltage Vds of 56V applied to the switch M, and the voltage of 128V applied to the output diode D3, in the duty ratio of 0.57.

However, when the boost converter according to the exemplary embodiment of the present invention has the same output voltage and the same turn ratio, it may have the voltage Vds of 32V applied to the switch M, the voltage VD2 of 96V applied to the first diode D2, the voltage Vc of 72V applied to the first capacitor Cs, and the voltage of 128V applied to the output diode D3, in the duty ratio of 0.25. Therefore, when the boost converter according to the exemplary embodiment of the present invention and the tap inductor boost converter according to the related art have the same output voltage, the boost converter according to the exemplary embodiment of the present invention may reduce the duty ratio, reduce voltage stress applied to the switch M and the output diode D3, and increase the power conversion efficiency, as compared to the tap inductor boost converter according to the related art. In addition, when the boost converter according to the exemplary embodiment of the present invention and the tap inductor boost converter according to the related art have the same duty ratio, the boost converter according to the exemplary embodiment of the present invention may have a higher boost ratio than that of the tap inductor boost converter according to the related art.

As set forth above, in a boost converter according to exemplary embodiments of the present invention, the voltage stress of each element may be reduced, without using a separate loss snubber circuit, by clamping a voltage applied to an output diode to correspond to a difference between an input voltage and an output voltage. In addition, a duty ratio for generating the same output as that of an existing tap inductor boost convert may be reduced, as compared to the existing tap inductor boost convert, thereby increasing power conversion efficiency.

While the present invention has been shown and described in connection with the exemplary embodiments, it will be apparent to those skilled in the art that modifications and variations can be made without departing from the spirit and scope of the invention as defined by the appended claims.

What is claimed is:

1. A boost converter comprising:
    a transformer including a primary winding receiving an input power and a secondary winding electromagnetically coupled to the primary winding and having a preset turns ratio therewith;
    a switching unit switching the input power transferred to the primary winding on and off according to a preset duty ratio;
    a stabilizing unit including an output diode rectifying a power outputted from the secondary winding to thereby stabilize an output power; and
    a clamping unit clamping a voltage, applied to the output diode, to correspond to a difference between the input power and the output power during a switching on operation of the switching unit,
    wherein the transformer further includes a leakage inductor connected between a first end of the primary winding and one end of an input power terminal receiving the input power in series and a magnetization inductor parallel-connected to the first end and a second end of the primary winding, and
    wherein the switching unit includes a switch connected between a connection point, at which the second end of the primary winding and a first end of the secondary winding are connected to each other, and a ground, and
    wherein the clamping unit includes a first diode having an anode connected to the one end of the input power terminal and a cathode connected to one end of the output diode, and a first capacitor having one end connected to the cathode of the first diode and another end connected to a second end of the secondary winding.

2. The boost converter of claim 1, wherein the one end of the output diode is connected to the cathode of the first diode and the one end of the first capacitor, and
    the stabilizing unit further includes an output capacitor connected to another end of the output diode and the ground.

3. The boost converter of claim 1, wherein the primary and secondary windings are wound in a same direction.

4. The boost converter of claim 1, wherein the first capacitor is charged with a voltage from the secondary winding and an input voltage while the switch is switched on, and transfers the charged voltage to the stabilizing unit while the switch is switched off.

* * * * *